Oct. 7, 1930.   W. P. WHITTINGTON   1,777,816
VACUUM SYSTEM
Filed Dec. 27, 1926   2 Sheets-Sheet 1
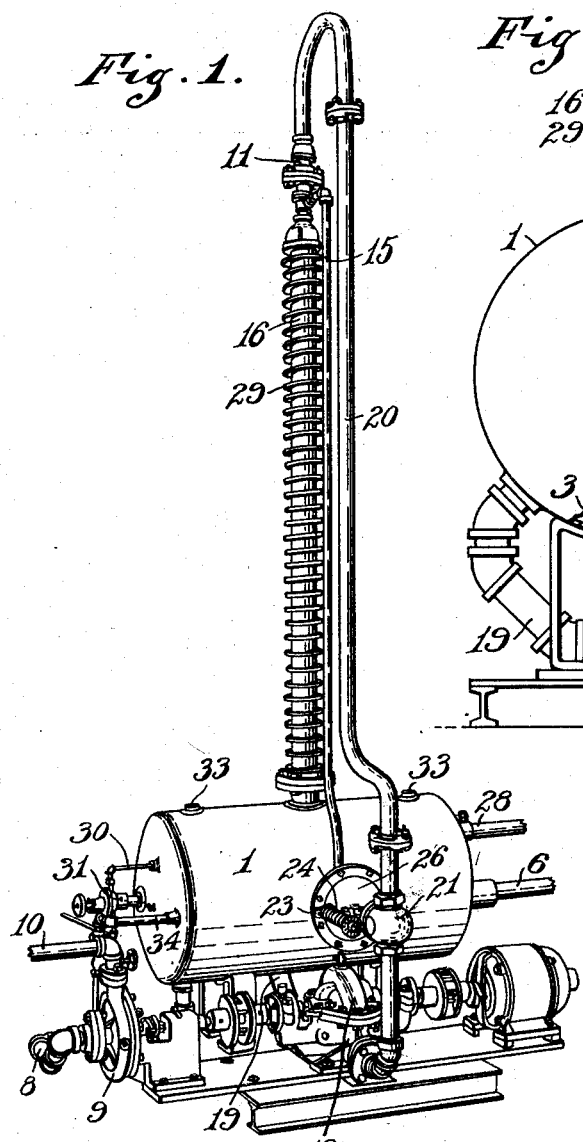
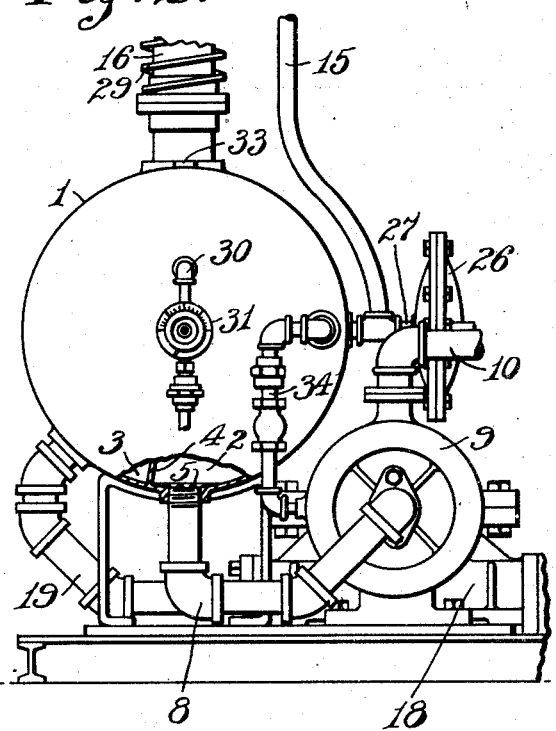
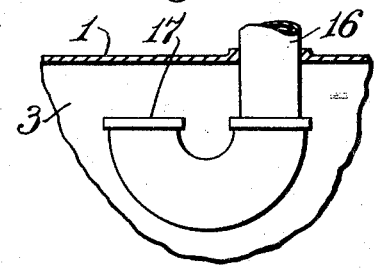
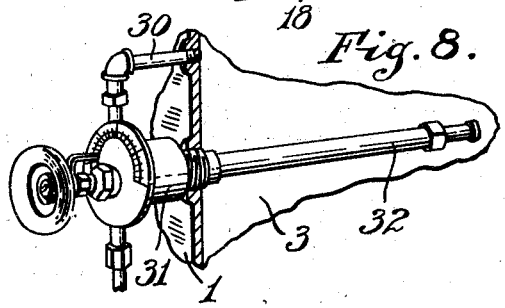
INVENTOR.
William P. Whittington,
BY
Hood + Hahn
ATTORNEYS Oct. 7, 1930.   W. P. WHITTINGTON   1,777,816
VACUUM SYSTEM
Filed Dec. 27, 1926   2 Sheets-Sheet 2

INVENTOR.
William P. Whittington,
BY
Hood & Hahn.
ATTORNEYS

Patented Oct. 7, 1930

1,777,816

UNITED STATES PATENT OFFICE

WILLIAM P. WHITTINGTON, OF INDIANAPOLIS, INDIANA, ASSIGNOR TO ILLINOIS ENGINEERING COMPANY, A CORPORATION OF ILLINOIS

VACUUM SYSTEM

Application filed December 27, 1926. Serial No. 157,071.

My invention relates to improvements in vacuum producing apparatus and is particularly applicable to that type of apparatus known as a wet vacuum pumping apparatus used in connection with vapor and steam heating apparatus and in which the air and water are exhausted from the return line of the heating system to produce circulation of the heating fluid through the system.

It is one of the objects of my invention to provide a vacuum producing apparatus which will efficiently and automatically operate in accordance with the demands placed thereon without undue attention or service.

For the purpose of disclosing my invention I have illustrated one embodiment thereof in the accompanying drawings in which Fig. 1 is a perspective view of an apparatus embodying my invention;

Fig. 2 is an end elevation partly in section of the same;

Fig. 7 is a detail view of the bottom part of the barometric tube, and

Fig. 8 is a detail view of a temperature controlled valve.

Figure 4:
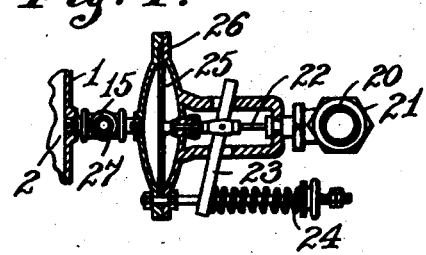
Fig. 4 is a detail section of the valve controlling mechanism.
Figure 5:
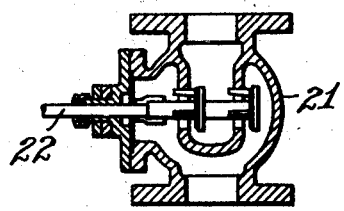
Fig. 5 is a detail section of the valve.
Figure 3:
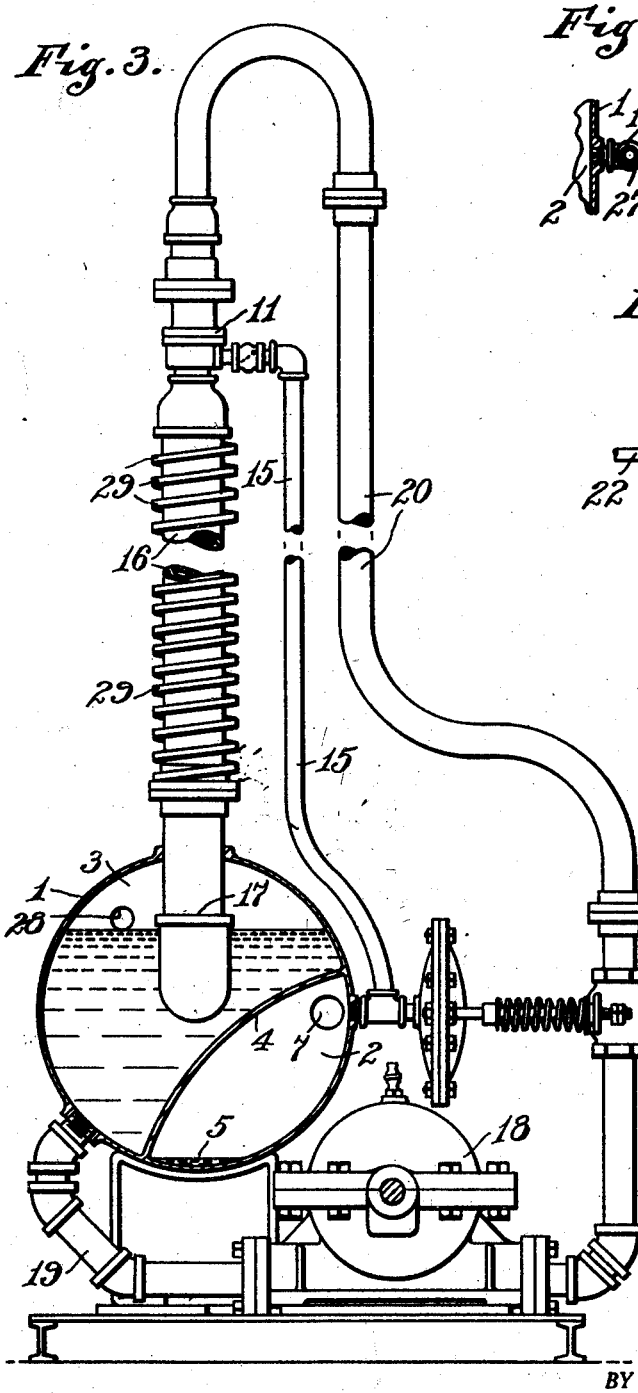
Fig. 3 is a longitudinal sectional view of the apparatus illustrated in Fig. 1.
Figure 6:
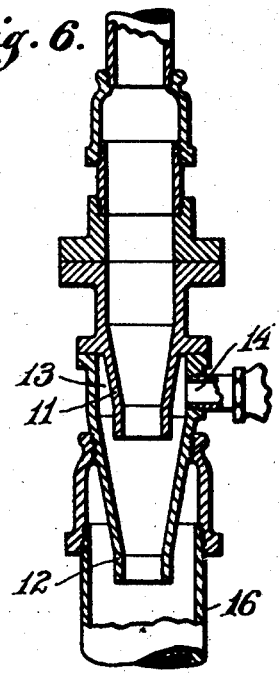
Fig. 6 is a detail section of the ejector.

In the embodiment of the invention illustrated I provide a tank or container which may be cylindrical in form and closed at each end and is divided into two chambers that may be respectively termed the vacuum chamber 2 and the liquid chamber 3. The vacuum chamber 2 is formed by a dividing wall 4 extending the full length of the tank and this wall at its lower end starts at a point to one side of the vertical center of the tank and, having a slightly arcuate formation, terminates at one side of the tank 1 at a point slightly above its horizontal center whereby the bottom of the tank 1 forms a liquid well 5 for a purpose which will more fully appear hereinafter.

The return line 6 of the heating system, or other system or apparatus in which it is desired to maintain a vacuum, is connected with the chamber 2 at the point 7 near the top thereof and the bottom of the liquid well 5 is connected by the conduit 8 with the intake of a centrifugal pump 9, the delivery of which is connected by a pipe 10 with the return side of the boiler of a heating system or may discharge to any suitable apparatus. In other words, the pipe 6 provides a combined air and liquid intake for the chamber 2 while the pipe 8 provides a liquid outlet for this chamber.

A partial vacuum is maintained in the chamber 2 by a water jet which comprises a nozzle 11 in series with which is a second nozzle 12, this second nozzle having a chamber or intake 13 surrounding the nozzle 11 and connected through the inlet port 14 by the pipe 15 with the upper part of the vacuum chamber 2. The jet nozzle discharges into an enlarged pipe 16 the lower end of which passes into, through the top of the tank 1, the liquid chamber 3 and is bent upwardly upon itself to discharge upwardly as at nozzle 17 and to provide a barometric seal in the pipe 16 thus forming a barometric leg into which the jet nozzle 11 discharges. Liquid is fed to the jet nozzle from the liquid tank 3 by means of a centrifugal pump 18 which is connected on its intake side by the conduit 19 with the liquid tank 3 and on its delivery side by the conduit 20 with the nozzle 11, at the upper end of the pipe 16, the construction being such that the liquid in the tank 3 is constantly circulated through the jet nozzle.

The conduit 20 is provided with a balanced valve 21 the opening and closing of which is controlled by the extent of the partial vacuum produced in the chamber 2 and to this end the valve stem 22 of the valve 21 is connected by a lever 23 with a coiled spring 24 exerting a pressure to move the valve to completely open position. The valve stem 22 is also connected to a diaphragm 25 arranged in a suitable casing 26 which diaphragm is subject to the influence of the partial vacuum produced in the chamber 2, or in the pipe 15, through the pipe coupling 27 so that, as a partial vacuum in the chamber 2 increases, the diaphragm 25 will be acted on to move the valve 21 towards closed position and against the tension of the spring 24.

The operation of the apparatus thus far described is extremely simple. Due to the action of the pump 18 a circulation of water will be set up from the liquid chamber 3 through the pipe 20 through the jet nozzles 11 and 12 and the conduit 16 back into the liquid chamber. The discharge of the water through the nozzle 11 will create a partial vacuum at the port 14 thereby drawing the air through the pipe 15 from the vacuum tank 2 and this air and water will be discharged through the nozzle 12 into the pipe 16. Due to the upward bend of the pipe 16 a column of water or a water piston will be established in this pipe and the downward movement of this water piston will add to the efficiency of the nozzle 11 and greatly increase the vacuum produced at the port 14 by the creation of a secondary vacuum in the barometric leg thereby increasing the efficiency of the apparatus. It is obvious that the length of the barometric leg may be varied to meet varying conditions. The air and water discharged from the barometric leg 16 is discharged above the water line of the water tank 3 and the air thus discharged escapes through the air vent opening 28 in the tank. As the air discharges above the water line there is no danger of the air being discharged downwardly into the water tank and thereby being drawn out with the water in the tank through the pipe 19 to thereby affect the operation of the centrifugal pump 18. Due to the vacuum produced in the tank 2 the mixed air and water will be drawn from the return side of the heating system, through the pipe 6 and into the vacuum chamber 2, the water settling in the bottom of this chamber and the air passing out of the chamber through the pipe 15. The water is withdrawn from the well 5 by the pump 9 and delivered back to the boiler. It will be noted that due to the arrangement of the wall 4 one wall of the vacuum chamber is in intimate contact with the water in the water chamber 3. The type of pump most advantageous for withdrawing the water from the chamber 2 is a centrifugal type pump and with this type of pump when the water handled thereby reaches a rather high temperature the efficiency of the pump is cosiderably lowered and in some instances the pump will not operate at all. Under these circumstances the water in the vacuum chamber 2 will gradually back up in the chamber 2 and as it backs up it will be noted it comes in contact with the wall 4 and as the water in the chamber 3 is of considerably lower temperature the heat of this water in the vacuum chamber 2 is absorbed by the water in the chamber 3 so that the temperature of the water in the chamber 2 is sufficiently lowered to the point where the pump 9 will efficiently handle the same again.

The temperature of the water in the tank 3 tends to rise due to friction etc. and in order to overcome this tendency I provide the column 16 with radiating fins 29 throughout its length which tend to rapidly dissipate the heat and, furthermore, the tank or chamber 3 is connected by a supply pipe 30 with a cold water supply and through a thermostatically controlled valve 31, the thermostatic element 32 of which is immersed in the water of the tank 3. By this arrangement in event the temperature of the water in the tank 3 rises above a predetermined point, the valve 31 will be opened admitting cold water to the chamber 3, thereby effectually reducing the temperature of the water in this tank. The opening 28 provides an overflow opening for the tank so that even though cold water is admitted thereto the water level will not rise above this point.

In order that pressure in the liquid tank 3 may not build up and therefore in order to maintain not more than atmospheric pressure in said tank above the water level, I provide suitable air escape openings or vents 33 in the top of the tank so that such air which passes out through the pipe 16 will escape from the top of the chamber 3 to the atmosphere.

I prefer that the pump 9 shall be of the centrifugal type and as is well known in this type of pump it is necessary, in order that the same may operate, that it be primed or always supplied with liquid. To this end this pump is connected by the conduit 34, which has less capacity than the conduit 8, with the vacuum tank 2 so that a certain portion of the liquid withdrawn from the tank will again be delivered to the vacuum tank 2 through this bypass conduit 34. This insures at least the presence, under all conditions, of a priming charge in the well 5 so that the pump 9 will always be in condition to operate.

It is obvious that the operation of the device is entirely automatic. Where a large quantity of air and water is drawn through the pipe 6, the vacuum in the tank 2 is materially reduced permitting the spring 24 to more widely open the valve 21, increasing the amount of water delivered to the jet nozzles and thereby increasing the action of the jet nozzles to draw the air through the pipe 15. Likewise, where the demand is lowered by a comparatively small amount of air or water passing through the pipe 6, the vacuum in the chamber 2 will tend to increase, operating to move the valve 21 towards closed position and thus decreasing the supply of water to the spray jets and decreasing the load on the pump. The system is thus entirely automatic in its operation and will maintain a constant vacuum on the pipe 6 with a very small degree of variation.

I claim as my invention:

1. An injector having a liquid motive nozzle and inlet port, said nozzle discharging into a barometric leg discharging against not exceeding atmospheric pressure.

2. An injector having a liquid motive nozzle and inlet port, said nozzle discharging above a falling liquid piston in turn discharging against atmospheric pressure.

3. An ejector having a liquid motive nozzle and inlet port, said nozzle discharging into a columnar tube having formed therein a barometric seal at its lower end discharging against not exceeding atmospheric pressure.

4. An ejector having a liquid motive nozzle and inlet port, said nozzle discharging into a columnar tube discharging against not exceeding atmospheric pressure and having a liquid seal near its lower end.

5. An ejector having a liquid motive nozzle and inlet port, said nozzle discharging into a barometric leg discharging against not exceeding atmospheric pressure, means controlling the liquid supply to said motive nozzle and means subject to the influence of the vacuum force produced by said ejector for controlling the operation of said first mentioned means.

6. An ejector having a liquid motive nozzle and inlet port, said nozzle discharging above a falling liquid column having a discharge against not exceeding atmospheric pressure, means for controlling the liquid supply to said motive nozzle and means subject to the influence of the vacuum force produced by said ejector for controlling the operation of said first mentioned means.

7. An ejector having a liquid motive nozzle and inlet port, said nozzle discharging into a columnar tube having a barometric seal at its lower end and discharging against not exceeding atmospheric pressure, means controlling the liquid supply to said motive nozzle and means subject to the influence of the vacuum force produced by said ejector for controlling the operation of said first mentioned means.

8. An ejector having a liquid motive nozzle and inlet port, said nozzle discharging into a columnar tube discharging against not exceeding atmospheric pressure and having a liquid seal near its lower end, means controlling the liquid supply to said motive nozzle and means subject to the influence of the vacuum force produced by said ejector for controlling the operation of said valve.

9. An ejector having a liquid motive nozzle and inlet port, said nozzle discharging into a barometric leg discharging against not exceeding atmospheric pressure and said inlet port being connected with a vacuum chamber, means controlling the liquid supply to said motive nozzle and means subject to the influence of the vacuum produced in said chamber for controlling the action of said first mentioned means.

10. An ejector having a liquid motive nozzle and inlet port, said nozzle discharging into a columnar tube having a liquid seal near its lower end and discharging against not exceeding atmospheric pressure, the inlet port of the ejector being connected with a vacuum chamber, means controlling the liquid supply to said motive nozzle and means subject to the influence of the vacuum produced in said chamber for controlling the action of said first mentioned means.

11. The combination with a liquid tank, of an ejector having a liquid motive nozzle and inlet port, said nozzle discharging into a columnar tube terminating in said liquid tank and discharging away from and above the liquid level thereof and against not exceeding atmospheric pressure.

12. The combination with a liquid tank, of an ejector having a liquid motive nozzle and inlet port, said nozzle discharging into a columnar tube discharging against not exceeding atmospheric pressure into said tank and having a liquid seal at its lower end.

13. The combination with a liquid tank, of an ejector having a liquid motive nozzle and inlet port, a pump receiving the liquid from said liquid tank and delivering the same to said nozzle, said nozzle discharging into a columnar tube delivering into said tank against not exceeding atmospheric pressure and having a liquid seal at the lower end and heat radiating fins on said tube.

14. The combination with a liquid tank, of an ejector, a pump receiving the liquid from said liquid tank and delivering the same to said ejector, said ejector including a motive nozzle and an inlet port, said nozzle discharging into a barometric condensing tube discharging against not exceeding atmospheric pressure terminating in said liquid tank.

15. The combination with a liquid tank, of an ejector having a motive nozzle and inlet port, a pump receiving liquid from said liquid tank and delivering the same to said ejector and said nozzle discharging into a condensing barometric tube terminating in said tank and discharging against not exceeding atmospheric pressure.

16. An ejector having a liquid motive nozzle and inlet port, said nozzle discharging into a barometric leg the height of the discharge end of which does not substantially exceed sealing height.

17. An ejector having a liquid motive nozzle and inlet port, said nozzle discharging into a barometric leg the height of the discharge end of which does not substantially exceed sealing height, means controlling the liquid supply to said motive nozzle and means subject to the influence of the vacuum force produced by said ejector for controlling the operation of said first mentioned means.

18. An air pump comprising a vertical tube discharging at its bottom against not exceeding atmospheric pressure and having an inlet at its upper end, and a motive liquid delivery nozzle discharging into the upper end of said tube at high velocity, the liquid in said tube comprising the motive force of the pump, said tube having a liquid seal at its lower end.

19. An air pump comprising a vertical tube discharging at its lower end against not exceeding atmospheric pressure and having an inlet port at its upper end, and a nozzle discharging into said tube above a falling liquid piston in turn discharging against atmospheric pressure, said tube having a liquid seal at its lower end.

20. An air pump comprising a vertical columnar tube having formed therein at its lower end a barometric seal discharging against not exceeding atmospheric pressure and having an inlet port at its upper end, and a motive liquid delivery nozzle discharging into the upper end of said tube at high velocity, the liquid in said tube comprising the motive force of said pump.

21. The combination with an air pump comprising a vertical tube discharging at its bottom against not exceeding atmospheric pressure and having an inlet at its upper end, a motive liquid delivery nozzle discharging into the upper end of said tube at high velocity, the liquid in said tube comprising the motive force of the pump, of means controlling the liquid supply to said motive nozzle and means subject to the influence of the vacuum force produced by said pump for controlling the operation of said first mentioned means.

22. The combination with an air pump comprising a vertical tube having formed therein at its lower end a barometric seal discharging against not exceeding atmospheric pressure and having at its upper end an inlet port, and a motive liquid delivery nozzle discharging into the upper end of said tube at high velocity, the liquid in said tube comprising the motive force, of means for controlling the liquid supply to said nozzle and means subject to the influence of the vacuum force produced by said pump for controlling the operation of said first mentioned means.

23. The combination with an air pump comprising a vertical tube discharging at its bottom against not exceeding atmospheric pressure and having an inlet at its upper end, a motive liquid delivery nozzle discharging into the upper end of said tube at high velocity, the liquid in said tube comprising the motive force of the pump, of a vacuum chamber connected with said inlet port, means controlling the liquid supply to said nozzle and means subject to the influence of the vacuum produced in said chamber for controlling the action of said first mentioned means.

In witness whereof, I have hereunto set my hand at Indianapolis, Indiana, this 22nd day of December, A. D. one thousand nine hundred and twenty-six.

WILLIAM P. WHITTINGTON.

CERTIFICATE OF CORRECTION.

Patent No. 1,777,816.                       Granted October 7, 1930, to

WILLIAM P. WHITTINGTON.

It is hereby certified that error appears in the printed specification of the above numbered patent requiring correction as follows: Page 3, lines 2 and 6, claims 1 and 2, respectively, for the word "injector" read ejector; and that the said Letters Patent should be read with these corrections therein that the same may conform to the record of the case in the Patent Office.

Signed and sealed this 9th day of December, A. D. 1930.

(Seal)                                         M. J. Moore,
                                            Acting Commissioner of Patents.